United States Patent
McCarthy (10) Patent No.: US 10,002,076 B2
(45) Date of Patent: Jun. 19, 2018

(54) SHARED CACHE PROTOCOL FOR PARALLEL SEARCH AND REPLACEMENT

(71) Applicant: Freescale Semiconductor, Inc., Austin, TX (US)

(72) Inventor: Daniel M. McCarthy, Phoenix, AZ (US)

(73) Assignee: NXP USA, Inc., Austin, TX (US)

( * ) Notice: Subject to any disclaimer, the term of this patent is extended or adjusted under 35 U.S.C. 154(b) by 163 days.

(21) Appl. No.: 14/868,477

(22) Filed: Sep. 29, 2015

(65) Prior Publication Data
US 2017/0091096 A1 Mar. 30, 2017

(51) Int. Cl.
| | |
|---|---|
| G06F 12/08 | (2016.01) |
| G06F 12/0815 | (2016.01) |
| G06F 12/123 | (2016.01) |
| G06F 12/0844 | (2016.01) |
| G06F 12/0853 | (2016.01) |
| G06F 12/0855 | (2016.01) |
| G06F 12/128 | (2016.01) |

(52) U.S. Cl.
CPC ...... G06F 12/0815 (2013.01); G06F 12/0844 (2013.01); G06F 12/0853 (2013.01); G06F 12/0855 (2013.01); G06F 12/123 (2013.01); G06F 12/128 (2013.01); G06F 2212/621 (2013.01); G06F 2212/69 (2013.01)

(58) Field of Classification Search
CPC ....... G06F 12/00; G06F 12/082; G06F 12/122
USPC ................... 711/100, 136, 154, 200
See application file for complete search history.

(56) References Cited

U.S. PATENT DOCUMENTS

| | | | | |
|---|---|---|---|---|
| 5,509,135 A | * | 4/1996 | Steely, Jr. | ........... G06F 12/0864 711/147 |
| 5,551,002 A | * | 8/1996 | Rosich | .................. G06F 12/123 711/134 |
| 5,765,193 A | * | 6/1998 | Rosich | ................ G06F 12/0804 711/136 |

(Continued)

FOREIGN PATENT DOCUMENTS

| | | |
|---|---|---|
| EP | 0989496 A2 | 3/2000 |
| EP | 1215581 A1 | 6/2002 |

*Primary Examiner* — Tuan Thai (57) ABSTRACT

A method includes generating least-recently-used location information for a shared set-associative multi-access cache and next-to least-recently-used location information for the shared set-associative multi-access cache. The method includes concurrently accessing a shared set-associative multi-access cache in response to a first memory request from a first memory requestor and a second memory request from a second memory requestor based on the least-recently-used location information and the next-to least-recently-used location information. The method may include updating the least-recently-used location information and the next-to least-recently-used location information in response to concurrent access to the shared set-associative multi-access cache according to the first memory request and the second memory request. The method may include independently handling the first and second memory accesses concurrently in response to first and second set fields being different and cooperatively handling the first and second memory access concurrently in response to first and second set fields identifying a target set.

10 Claims, 8 Drawing Sheets

(56) References Cited

U.S. PATENT DOCUMENTS

| | | | |
|---|---|---|---|
| 6,732,238 B1 * | 5/2004 | Evans | G06F 12/0864 |
| | | | 365/49.1 |
| 6,854,046 B1 * | 2/2005 | Evans | G06F 12/1036 |
| | | | 711/203 |
| 2004/0083341 A1 | 4/2004 | Robinson et al. | |
| 2013/0304991 A1 | 11/2013 | Boettcher | |
| 2013/0339623 A1 | 12/2013 | Ambroladze et al. | |
| 2013/0339672 A1 * | 12/2013 | Jacobi | G06F 9/30 |
| | | | 712/220 |
| 2015/0026410 A1 | 1/2015 | Nguyen et al. | |

* cited by examiner

SHARED CACHE PROTOCOL FOR PARALLEL SEARCH AND REPLACEMENT

BACKGROUND

Field of the Invention

This invention relates to processing systems and, more particularly, to cache memory systems of low-cost processing systems.

Description of the Related Art

Embedded processing systems include increasing numbers of processing elements (e.g., both heterogeneous and homogeneous multiprocessors, graphics processors, video processors, direct memory access controllers, or other processing engines). Those processing elements may execute at frequencies higher than the executing frequency of on-chip memory and off-chip memory. A typical embedded processing system includes a cache memory to improve the performance of high speed processing elements that access those slower memories. In general, cache memory is an expensive element with respect to size and power dissipation. The cost of cache memory is less of an issue in large processing systems than in small, low-cost, low-power embedded processing systems. Thus, large processing systems typically include large caches, while low-cost processing systems include relatively small caches and redundant caches may be cost-prohibitive in the latter systems. In addition, large caches of large processing systems typically have low cache miss rates that have negligible impact on system performance, whereas cache misses of small caches in small, low-cost, low-power applications may have substantial impact on performance. Accordingly, improved cache memory techniques are desired.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

The use of the same reference symbols in different drawings indicates similar or identical items.

DETAILED DESCRIPTION

A multi-access, shared cache having storage elements that are fully accessible by multiple processing units in parallel reduces cost and power dissipation of a processing system while increasing system performance as compared to processing systems that include redundant cache storage resources for each processing element of a multi-processing system. The multi-access, shared cache is an n-way, set-associative cache that implements a modified least-recently-used replacement policy adapted for concurrent memory accesses. The multi-access cache allows efficient and effective sharing of cache storage among two or more request streams, without restrictions on the timing or addresses of those requests while implementing a least-recently-used replacement algorithm across any combination of concurrent or simultaneous cache misses. As referred to herein, concurrent memory accesses refer to memory accesses issued to the memory that overlap in time, but are not necessarily synchronized. As referred to herein, simultaneous accesses are synchronized at the start and finish and overlap in time. In general, a least-recently-used replacement policy discards and replaces least recently used items first. The policy requires recording temporal use information regarding access of each storage location. Implementation of such policy may be expensive. In at least one embodiment, the multi-access cache maintains age bits for cache-lines and tracks the least-recently-used cache location based on those age bits. Accordingly, every time a cache-line is used, the temporal use information of all other cache-lines changes. In large multiprocessor systems with large main memories and large caches, completely accurate least-recently-used information is expensive due to the requirement to update the temporal information for every memory access. However, in low-power, low-cost, embedded applications, caches are smaller and require less temporal information, which may be relatively inexpensive to update each clock cycle based on two or more concurrent memory accesses.

Figure 1:
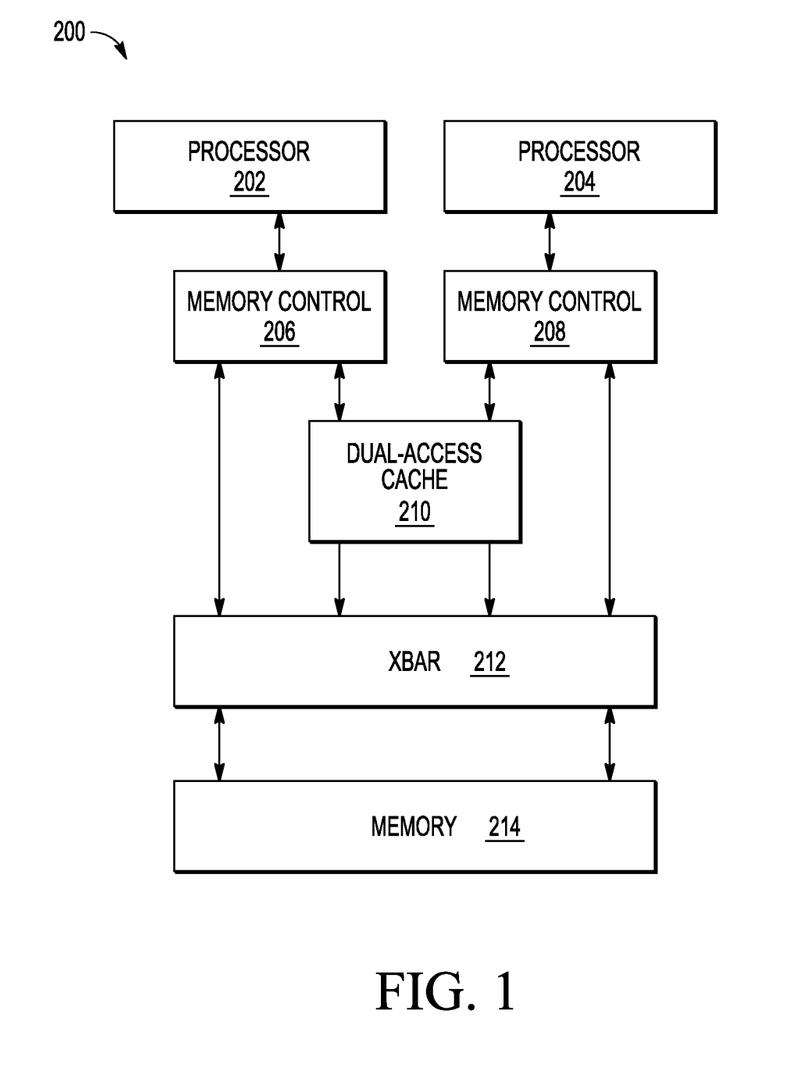
FIG. 1 illustrates a functional block diagram of an exemplary processing system including a multi-access, shared cache consistent with at least one embodiment of the invention.

Referring to FIG. 1, embedded processing system 200 includes processor 202 and processor 204 integrated onto a single integrated circuit die, which may include main memory or be coupled to external memory 214. Processors 202 and 204 each may be heterogeneous and homogeneous multiprocessors, graphics processors, video processors, direct memory access controllers, other processing engines or combination thereof. Embedded processing system 200 includes dual-access cache 210, which is a multi-access, 4-way set-associative cache. Dual-access cache 210 is shared by processor 202 and processor 204. Dual-access cache 210 may receive and process in parallel one memory request from each of processor 202 and processor 204 per clock cycle. Note that storage locations of dual-access cache 210 are shared by multiple memory requestors in its entirety. That is, each memory requestor has complete access to all sets and ways of the cache at any time, not merely access to a predetermined set of a set-associative cache partitioned into ways that are separately accessible by dedicated memory requestors. Therefore, all storage elements of dual-access cache 210 are equally accessible to processor 202 and 204 (i.e., dual-access cache 210 is not partitioned to provide dedicated storage to processor 202 or processor 204). When processor 202 is in a low usage mode or is idle, processor 204 may utilize more than its equal share of storage locations of in dual-access cache 210, thereby improving the performance (e.g., reducing the cache miss rate and reducing cycles per instruction) of processor 204.

Although conventional shared caches force simultaneous accesses to be searched serially or searched in parallel but serialize cache miss processing and the associated replacement choice, dual-access cache 210 provides concurrent access to processor 202 and processor 204. Dual-access cache 210 supports concurrent accesses to search the cache in parallel and handles any combination of cache hits and misses and associated replacements among the searches, in parallel. Dual-access cache 210 provides least-recently-used replacement allocation information for any cache miss. In addition, dual-access cache 210 provides next-to least-recently-used (NLRU) replacement allocation information for any cache miss that occurs in parallel with the first cache miss. Providing both least-recently-used and next-to least-recently-used state information allows dual-access cache 210 to operate efficiently and effectively with few or no restrictions on the timing or addressing of multiple concurrent cache requests. Dual-access cache 210 also generates, in parallel, next-state replacement allocation information to update the least-recently-used replacement allocation state and the next-to least-recently-used replacement allocation state.

Figure 3:
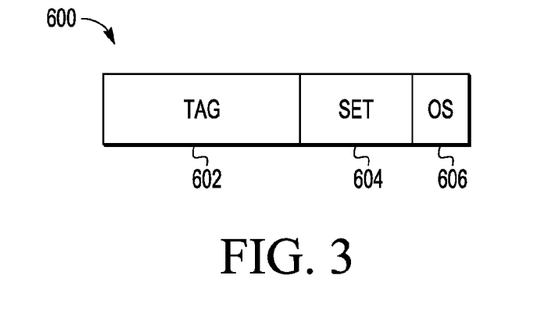
FIG. 3 illustrates exemplary bit fields of a memory address used to access the multi-access, shared cache of FIG. 2 consistent with at least one embodiment of the invention.

In at least one embodiment, dual-access cache 210 is a four-way set associative cache, i.e., each block in memory 214 may be written to any of four different locations in the cache. Those four different locations form a set of four elements (or blocks), one in each way of dual-access cache 210. To locate whether a particular memory element resides in dual-access cache 210, all elements of the set must be searched. For example, a set includes one element in each of DATA_0, DATA_1, DATA_2, and DATA_3 of cache data storage 309. Each element of the set has an identifying tag stored in a corresponding location of TAG_1, TAG_1, TAG_2, and TAG_3 of tag storage 307. Referring to FIG. 3, the bits of a memory address of a memory request may be partitioned into three portions: tag field 602, set field 604 (or index field 604), and offset field 606. Set field 604 identifies which row (or set of cache lines) of dual-access cache 210 is used for the corresponding memory address. Each memory address may only be stored in a particular row of the cache. Tag field 602 identifies the address of the actual data fetched from main memory 214 and typically contains the most significant bits of the address. Tag bits of a memory address of a memory request are compared to tag bits associated with the contents of the row of the cache that is retrieved according to the corresponding index to determine whether the row includes contents of the target memory location or the contents of another, irrelevant memory location that has the same index bits as the target memory location of the memory access. Offset field 606 indicates a block offset or displacement.

Referring back to FIG. 2, dual-access cache 210 has a throughput of two concurrent cache accesses per cycle. To provide that throughput, dual-access cache 210 includes master busses 362 and 364, slave busses 366 and 368, shared tag storage 307, shared cache data storage 309, hit logic 311, dual-access miss and replacement unit 322, bus control 302, and bus control 304. Least recently used state information and next-to least-recently-used information may be stored in dual-access miss and replacement unit 322 or in other portions of dual-access cache 210. Control registers within bus control 302 or bus control 304 or other portions of dual-access cache 210 include one or more of control and configuration registers, including registers to enable or disable the cache, clear the entire cache or a selected entry, partition the cache by fetch types, or lock cache ways. Master busses 362 and 364 provide two concurrent memory requests. Slave buses 366 and 368 allow servicing of two concurrent memory requests including those that result in two simultaneous miss fetches. Tag storage 307 and data storage 309 are organized as a four-way, set-associative cache supporting dual accesses to both the tag information and corresponding data. Two sets of tag comparators, tag comparators 342, 344, 346, and 348, and tag comparators 350, 352, 354, and 356, allow two simultaneous cache searches. Dual-access miss and replacement unit 322 provides, to the cache search logic, information for each cache search in parallel if the concurrent memory accesses are associated with different sets of dual-access cache 210.

Figure 2:
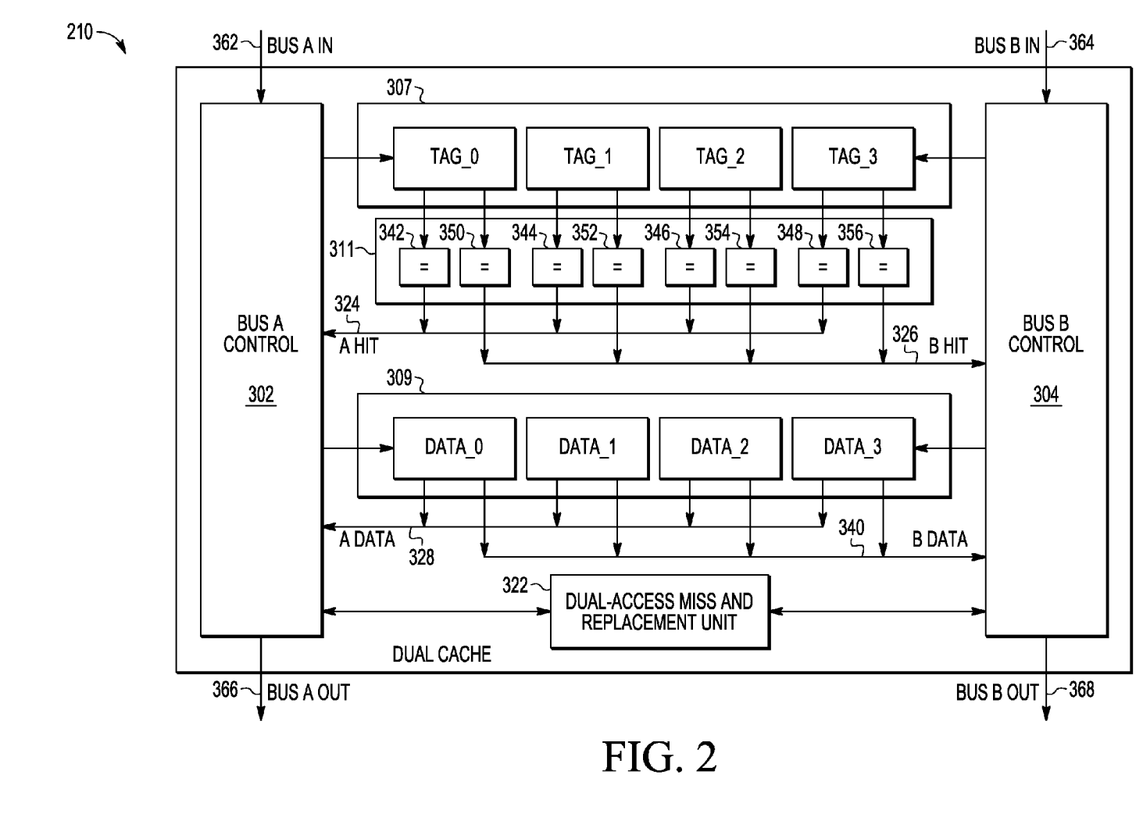
FIG. 2 illustrates a functional block diagram of an exemplary multi-access, shared cache of FIG. 1 consistent with at least one embodiment of the invention.

In at least one embodiment, dual-access miss and replacement unit 322 identifies, in parallel, least recently used cache location information for the cache searches if the memory accesses are to different sets of dual-access cache 210. The least-recently-used determination accounts for locked cache ways or entries of each set that may not be overwritten. Dual-access miss and replacement unit 322 also updates, in parallel, the temporal information for each memory access of a location of dual-access cache 210.

Still referring to FIG. 2, for each access of a location of data storage 309, memory access, search logic 311 compares the tag portion of the target memory address to the contents of each location of TAG_0, TAG_1, TAG_2, and TAG_3 of tag storage 307 of a set that corresponds to the index of the target memory address. Search logic 311 generates a corresponding hit indicator on A_HIT or B_HIT, as the case may be, according to whether the memory request originated on BUSAIN 362 or BUSBIN 364, respectively. In response to the hit indicator indicating that the contents of the main memory address are stored in shared cache data storage 309, BUS A CONTROL 302 or BUS B CONTROL 304, as the case may be, handles the memory request, either by reading contents of the corresponding location of data storage 309 and providing those contents to the requestor using BUSAOUT or BUSBOUT, or by writing to the location in shared cache data storage 309 according to a write policy implemented by dual-access cache 210 (e.g., write-through, write-back, etc.). Meanwhile, dual-access miss and replacement unit 322 updates temporal information that indicates at least the least recently used location of the set and the next-to least recently used location of the set of dual-access cache 210.

Figure 4:
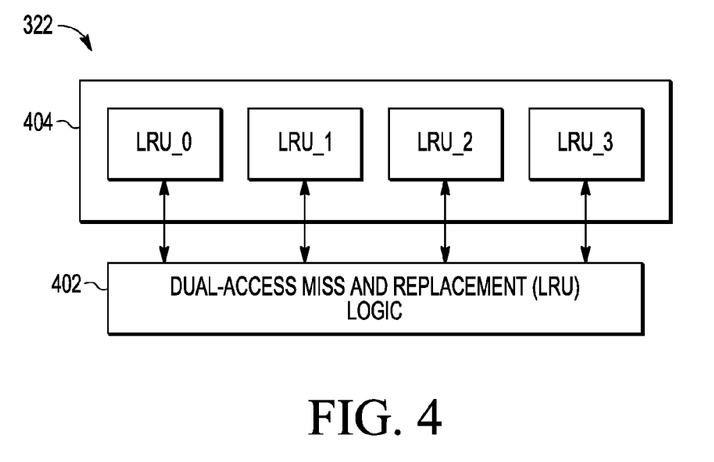
FIG. 4 illustrates a functional block diagram of an exemplary dual miss and replacement unit of the shared cache of FIG. 2 consistent with at least one embodiment of the invention.
Figure 5:
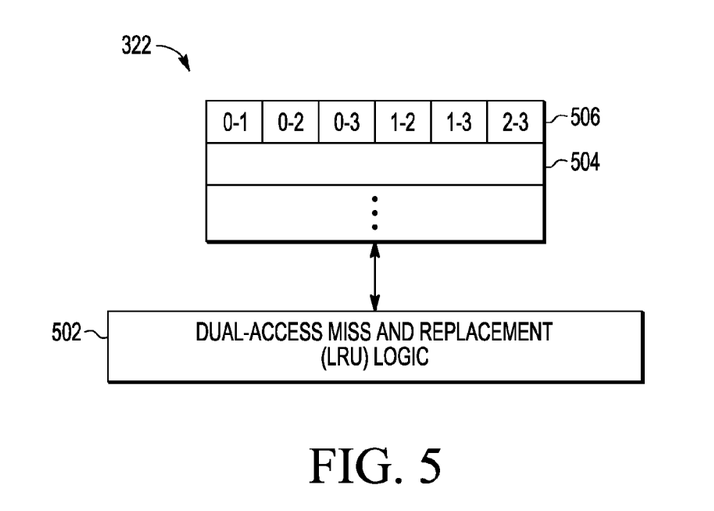
FIG. 5 illustrates a functional block diagram of an exemplary multi-access miss and replacement unit of the multi-access, shared cache of FIG. 2 consistent with at least one embodiment of the invention.

Dual-access miss and replacement unit 322 provides control signals for any necessary hit, miss, and replacement operations based on temporal information for each set (e.g., least-recently-used information and next-to least-recently-used information). In addition, dual-access miss and replacement unit 322 concurrently updates the temporal information in response to each memory access of the concurrent memory access. Dual-access miss and replacement unit 322 may include storage for the temporal information, or may access separate storage for the temporal information. Referring to FIG. 4, in at least one embodiment, dual-access miss and replacement unit 322 includes dual-access miss and replacement logic 402 and bits for each element of the set indicating temporal information with respect to each other element of the set. For an exemplary four-way set-associative cache, temporal information storage 404 includes LRU_0, LRU_1, LRU_2, and LRU_3, which include a temporal information storage element for each element of the cache. Those temporal information storage elements include bits (e.g., three bits for each element of a 4-way set-associative cache) indicating whether the corresponding cache element was more recently used or less-recently used than each other element of the set to which it belongs. Referring to FIG. 5, in another embodiment, dual-access miss and replacement unit 322 includes dual miss and replacement logic 502 and rather than use separate bits for each element of the set, temporal information storage 504 includes one set of temporal information bits for each set of the cache (e.g., six bits for each set of a 4-way, set-associative cache). Those bits indicate the temporal relationship of each combination of two elements, with no repetition. For a more efficient storage structure, for example, set temporal information entry 506 includes one bit for each combination of elements (element 0 to element 1, element 0 to element 2, element 0 to element 3, element 1 to element 2, element 1 to element 3, and element 2 to element 3), representing the temporal relationship (e.g., whether element x is more recently used than element y) between all of the elements of a set of a 4-way set-associative cache. Where two elements of a set are accessed at the same time, a conflict resolution policy (e.g., round robin, etc.) may be implemented to assign the next-state for which of the two accessed elements is more-recently used. Where a different number of ways may be used, a different number of bits are used to represent the appropriate temporal relationships.

In at least one embodiment, for each set of the cache, six corresponding temporal information bits may be encoded as described in Table 1. The six temporal information bits may be encoded to have any one of twenty-four valid bit encodings described in Table 2.

TABLE 1

Example Temporal Information Bit Description

| Bit | Description |
|---|---|
| 0-1 | if = 0, way 0 less recently used than way 1; if = 1, way 0 more recently used than way 1 |
| 0-2 | if = 0, way 0 less recently used than way 2; if = 1, way 0 more recently used than way 2 |
| 0-3 | if = 0, way 0 less recently used than way 3; if = 1, way 0 more recently used than way 3 |
| 1-2 | if = 0, way 1 less recently used than way 2; if = 1, way 1 more recently used than way 2 |
| 1-3 | if = 0, way 1 less recently used than way 3; if = 1, way 1 more recently used than way 3 |
| 2-3 | if = 0, way 2 less recently used than way 3; if = 1, way 2 more recently used than way 3 |

TABLE 2

Example Valid Temporal Information Bit Encodings

| Temporal Information Bits 0-1 0-2 0-3 1-2 1-3 2-3 | Way Order (Most-Recently Used to Least-Recently-Used) | Least-Recently- Used Way | Next-To Least-Recently- Used Way |
|---|---|---|---|
| 1 1 1 1 1 1 | 0123 | 3 | 2 |
| 1 1 1 1 1 0 | 0132 | 2 | 3 |
| 1 1 1 0 1 1 | 0213 | 3 | 1 |
| 1 1 1 0 0 1 | 0231 | 1 | 3 |
| 1 1 1 1 0 0 | 0312 | 2 | 1 |
| 1 1 1 0 0 0 | 0321 | 1 | 2 |
| 0 1 1 1 1 1 | 1023 | 3 | 2 |
| 0 1 1 1 1 0 | 1032 | 2 | 3 |
| 0 0 1 1 1 1 | 1203 | 3 | 0 |
| 0 0 0 1 1 1 | 1230 | 0 | 3 |
| 0 1 0 1 1 0 | 1302 | 2 | 0 |
| 0 0 0 1 1 0 | 1320 | 0 | 2 |
| 1 0 1 0 1 1 | 2013 | 3 | 1 |
| 1 0 1 0 0 1 | 2031 | 1 | 3 |
| 0 0 1 0 1 1 | 2103 | 3 | 0 |
| 0 0 0 0 1 1 | 2130 | 0 | 3 |
| 1 0 0 0 0 1 | 2301 | 1 | 0 |
| 0 0 0 0 0 1 | 2310 | 0 | 1 |
| 1 1 0 1 0 0 | 3012 | 2 | 1 |
| 1 1 0 0 0 0 | 3021 | 1 | 2 |
| 0 1 0 1 0 0 | 3102 | 2 | 0 |
| 0 0 0 1 0 0 | 3120 | 0 | 2 |
| 1 0 0 0 0 0 | 3201 | 1 | 0 |
| 0 0 0 0 0 0 | 3210 | 0 | 1 |

Upon system reset or cache invalidation, the temporal information bits for each set may be initialized to a predetermined valid state. For example, the temporal information bits 0-1 0-2 0-3 1-2 1-3 2-3 for each set may be initialized to all zeros, indicating that the most-recently used to least recently used ways are 3, 2, 1, 0. Note that other arrangements of temporal information may be used.

In an exemplary embodiment, dual-access cache 210 includes one lock information bit for each way of each set:

TABLE 3

Example Lock Information Bit Description

| Bit | Description |
|---|---|
| L0 | when set, way 0 is locked and should not be displaced from cache |
| L1 | when set, way 1 is locked and should not be displaced from cache |
| L2 | when set, way 2 is locked and should not be displaced from cache |
| L3 | when set, way 3 is locked and should not be displaced from cache |

In at least one embodiment, dual-access cache 210 combines the temporal information bits and the lock information bits in modified temporal information bits. Dual-access miss and replacement unit 322 uses the modified temporal information to account for locked cache ways that may not be overwritten. Dual-access cache 210 may generate the modified temporal information bits by forcing any locked ways to be most-recently used so that a locked way is not selected for replacement. Dual-access miss and replacement unit 322 identifies in parallel, least-recently-used and next-to least-recently-used cache location information for the cache searches if they are memory accesses to the same set of dual-access cache 210. In general, if an insufficient number of cache entries are unlocked in either or both sets to allocate for a miss, the miss or misses without cache entries for allocation in their set will proceed, the needed data will bypass the cache when available, and no cache allocation will occur. The determination of the least-recently-used location information and the next-to least-recently-used location cache locations excludes any locked locations of a set.

For an exemplary four-way set associative cache, if one memory request results in a cache miss to a set, then dual-access miss and replacement unit 322 uses the modified temporal information to select the least-recently-used location for that set as the replacement target way for the cache miss. If less than four of the ways of the set are locked for the single access to the set, then dual-access miss and replacement unit 322 allocates data to the replacement target way of the cache. If all four of the ways of the target set are locked, then no cache allocation occurs.

If two memory requests have the same target set of the cache and the dual access results in one cache hit and one cache miss, then dual-access miss and replacement unit 322 uses the modified temporal information to determine the least-recently-used way for that set. If the cache hit is to the least-recently-used way, dual-access miss and replacement unit 322 identifies the next-to least recently used way for that set as the replacement target way for the miss based on the modified temporal information. If the cache hit is to not to the least-recently-used way, dual-access miss and replacement unit 322 identifies the least-recently-used way for that set as the replacement target way for the miss based on the modified temporal information. If less than four ways of the set are locked for that set, then dual-access miss and replacement unit 322 allocates data to the replacement target way. If all four of the ways of the target set are locked, then no cache allocation occurs.

If two memory requests have the same target set of the cache and the dual access results in two cache misses to the same address, then only one replacement target way is needed. Dual-access miss and replacement unit 322 uses the modified temporal information to select the least-recently-used location for that set as the replacement target way for the cache miss. If less than four of the ways of a set are locked for the single access to the set, then dual-access miss and replacement unit 322 allocates data to the replacement target way. If all four ways of the target set are locked, then no cache allocation occurs.

If two memory requests have the same target set of the cache and the dual access results in two misses to different addresses, then two replacement target ways are needed. Dual-access miss and replacement unit 322 uses a prioritization technique (e.g., round-robin priority or fixed priority) to prioritize the cache misses. Dual-access miss and replacement unit 322 uses the modified temporal information to select the least-recently-used way and the next-to least-recently-used way for that set as the replacement target ways for the two misses. If less than three of the ways of the set are locked, dual-access miss and replacement unit 322 allocates data to both replacement targets. If three ways of the set are locked, then dual-access miss and replacement unit 322 allocates a replacement target way to the first priority miss and does not allocate a replacement target way for the second priority miss. If all four of the ways of the target set are locked, then no cache allocation occurs.

For the exemplary four-way set associative cache, if a single memory request to a set results in a cache hit, then dual-access miss and replacement unit 322 indicates the hit way as the most-recently used way of the set in the next-state temporal information for the set. If a single memory request to a set results in a cache miss, and less than four ways of the set are locked, then dual-access miss and replacement unit 322 updates the temporal information to indicate the way allocated to the miss as the most-recently used way in the next-state temporal information for the set. If all four of the ways of the target set are locked, then no cache allocation occurs and dual-access miss and replacement unit 322 does not modify the temporal information for the next-state temporal information for the set.

If two memory requests result in two cache hits to the same way, then dual-access miss and replacement unit 322 updates the temporal information to indicate the hit way as the most-recently used way in the next-state temporal information for the set. If two memory requests result in two cache hits to different ways of the set, then dual-access miss and replacement unit 322 uses a prioritization technique (e.g., round-robin priority or fixed priority) to prioritize the cache hits. Dual-access miss and replacement unit 322 updates the temporal information to indicate the higher priority way as the most-recently used way in the next-state temporal information for the set and indicates the lower priority way as the next-to most recently used way in the next-state temporal information for the set.

If two memory requests to a set result in one cache hit and one cache miss, then dual-access miss and replacement unit 322 updates the temporal information to indicate the hit way as the most-recently used way of the set in the next-state temporal information for the set. If less than four ways of the set are locked, then dual-access miss and replacement unit 322 updates the temporal information to indicate the way allocated to the cache miss as the next-to most-recently used way of the set in the next-state temporal information for the set. If all four of the ways of the target set are locked, then no cache allocation occurs and dual-access miss and replacement unit 322 does not modify the temporal information to reflect the cache miss in the next-state temporal information for the set. If two memory requests result in two cache hits to the same way of the set, then dual-access miss and replacement unit 322 makes only one cache allocation. If less than four ways of the set are locked, then dual-access miss and replacement unit 322 updates the temporal information to indicate the way allocated to the cache miss as the most-recently used way of the next-state temporal information for the set. If all four of the ways of the target set are locked, then no cache allocation occurs and dual-access miss and replacement unit 322 does not modify the temporal information in the next-state temporal information for the set.

If two memory requests to a set result in two cache misses to different addresses, then dual-access miss and replacement unit 322 uses a prioritization technique (e.g., round-robin priority or fixed priority) to prioritize the cache misses. If less than three of the ways of the set are locked, dual-access miss and replacement unit 322 updates the next state temporal information to indicate the way allocated to the higher priority miss as the most-recently used location in the next-state temporal information for the set and to indicate the way allocated to the lower priority miss as the next-to most recently used location in the next-state temporal information for the set. If three ways of the set are locked, then dual-access miss and replacement unit 322 determines the next state temporal information to indicate the way allocated to the higher priority miss as the most-recently used location and since no allocation is made for the lower priority miss, the temporal information is not updated for the lower priority miss.

FIGS. 6-11 illustrate exemplary information and control flows for the operation of dual-access cache 210. Note that other information and control flows are consistent with the invention described herein. The information and control flows of FIGS. 6-11 may be adapted to handle additional concurrent memory accesses by additional requestors accessing other embodiments of a multi-access cache.

Figure 6:
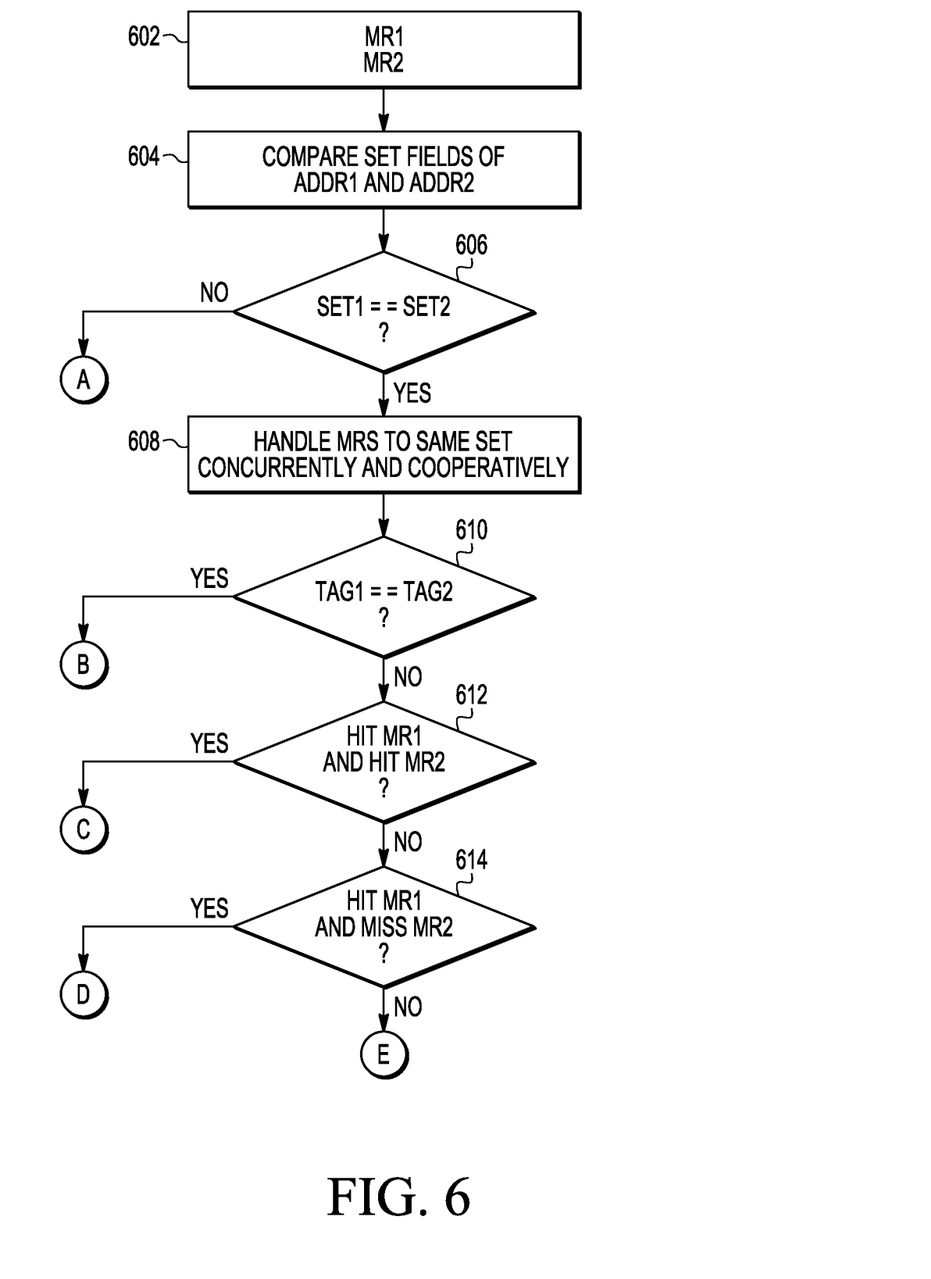
FIGS. 6-11 illustrate information and control flows for the operation of the multi-access, shared cache of FIG. 2 consistent with at least one embodiment of the invention.
Figure 7:
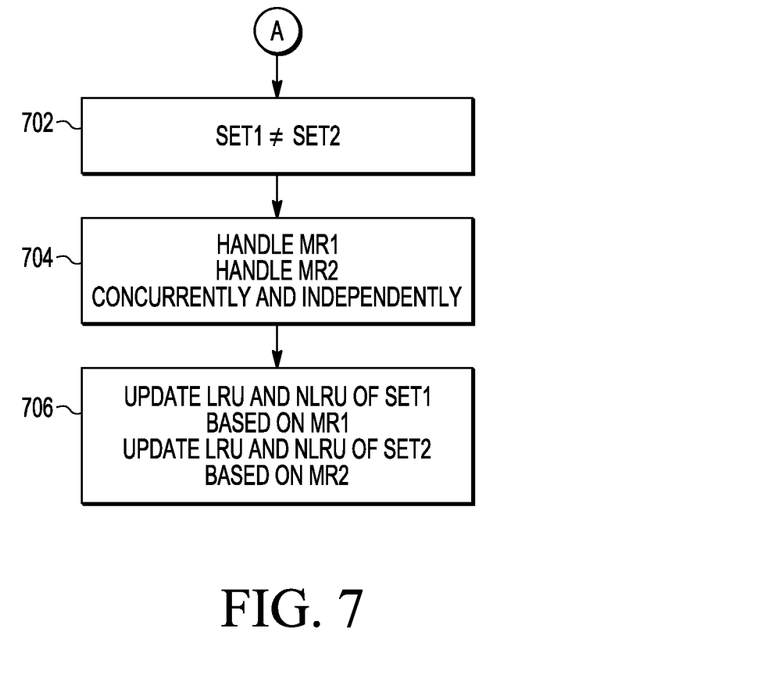

Referring to FIGS. 2 and 6, dual-access cache 210 receives a first memory request, MR1 concurrently with receiving a second memory request, MR2 (602). Bus A Control 302 and Bus B Control 304 decode the addresses of MR1 and MR2 in parallel and dual-access miss and replacement unit 322 compares the set fields of MR1 and MR2 (604). Referring to FIGS. 2, 6, and 7, if MR1 and MR2 are accessing different sets of dual-access cache 210 (702), then MR1 and MR2 are handled concurrently and independently from each other (704). When MR1 and MR2 access different sets of dual-access cache 210, and dual-access cache 210 has dual-addressing logic, dual ports and dual busses, those concurrent accesses to different sets will not effect on one another, regardless of whether those memory accesses result in cache hits, cache misses, or a combination thereof.

Dual-access miss and replacement unit 322 updates temporal information corresponding to MR1 separately to updating the temporal information corresponding to MR2 since they access different sets. Accordingly, dual-access miss and replacement unit 322 updates the least-recently-used location information and the next-to least-recently-used location information for the set corresponding to the target memory address of MR1 and updates the least-recently-used location information and the next-to least-recently-used location information for the second set corresponding to the target memory address of MR2 (706). Although MR1 and MR2 may be received by the memory system synchronously, those memory accesses may have different memory access times and may lose synchrony, e.g., due to a stall introduced by a cache miss of at least one of MR1 and MR2. Similarly, if MR1 and MR2 are received by the memory system asynchronously, but MR1 and MR2 result in different memory access times, they may be handled concurrently and may be completed synchronously or asynchronously to each other.

Figure 8:
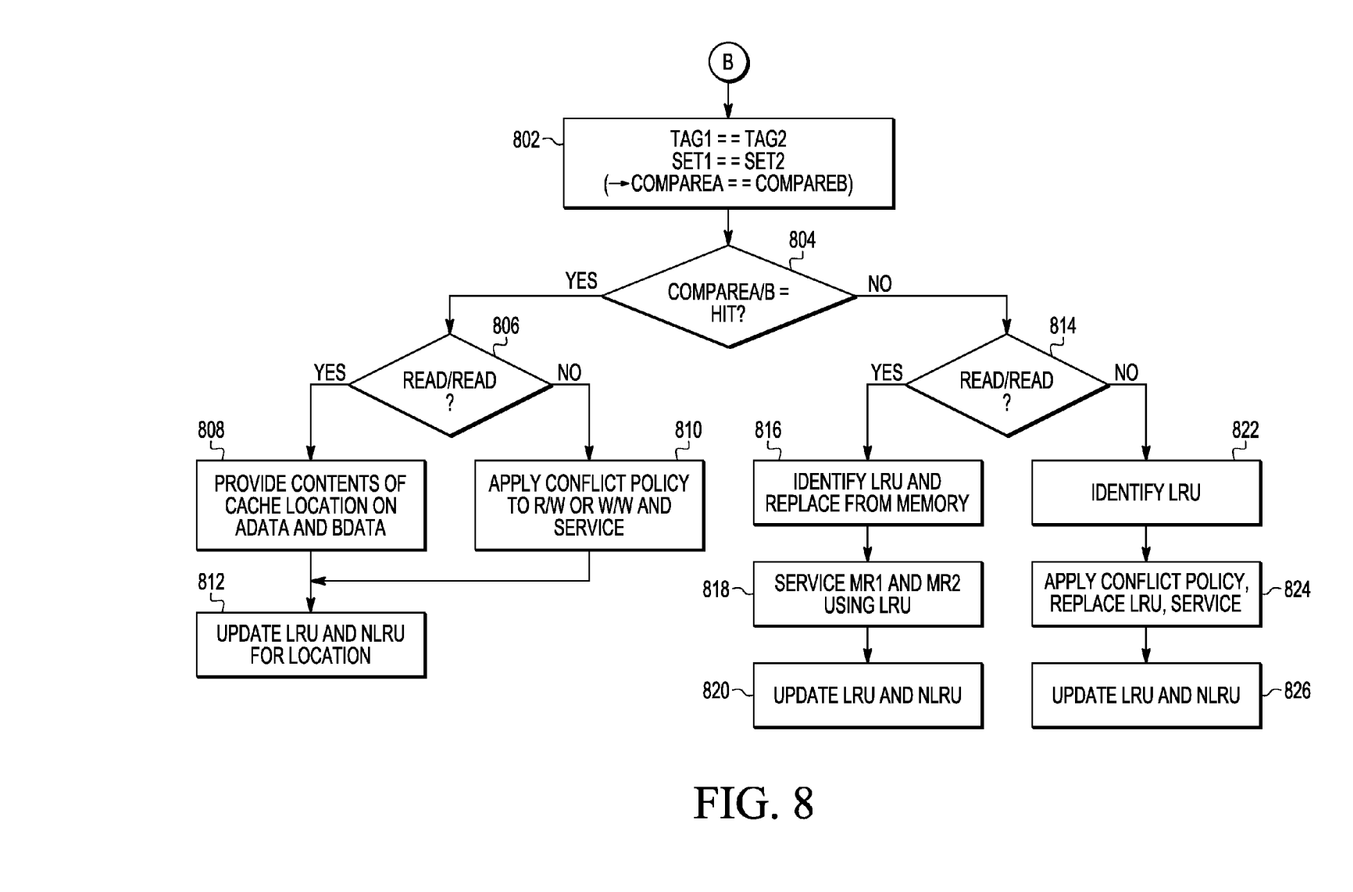

Referring to FIGS. 2 and 6, if MR1 and MR2 access the same set of dual-access cache 210 (606), then dual access cache 210 handles MR1 and MR2 concurrently and cooperatively (608). When MR1 and MR2 access the same set of dual-access cache, those accesses will affect at least the temporal information associated with the shared set and may affect each other further, depending on whether MR1 and MR2 access the same memory location when the memory addresses of MR1 and MR2 have the same tag. For example, dual-access miss and replacement unit 322 compares the tag portion of the target memory address of MR1 to the tag portion of the target memory address of MR2 (610). Referring to FIGS. 2, 6, and 8, when the tags are the same (802), dual-access miss and replacement unit 322 determines whether the access to the location having the shared memory address results in a cache hit (804). If the contents of shared memory address reside in the cache and result in a cache hit, dual-access miss and replacement unit 322 handles the memory accesses based on the type of memory access (e.g., read or write) and according to a conflict resolution policy. For example, if MR1 and MR2 are both read requests (806), then dual-access miss and replacement unit 322 provides the contents of the target cache location on both ADATA 328 and BDATA 340 (808) and dual-access miss and replacement unit 322 updates the least-recently-used location information and the next-to least-recently-used location information for the set corresponding to the shared target memory address of MR1 and MR2 (812). If MR1 and MR2 are both write requests or a read request and a write request (806), then dual-access miss and replacement unit 322 identifies the least-recently-used location of the set and may apply a conflict resolution policy (e.g., read-then-write, write-then-read, or a combination thereof) to service the memory requests (810). Dual-access miss and replacement unit 322 updates the least-recently-used location information and the next-to least-recently-used location information for the set corresponding to the shared target memory address of MR1 and MR2 to reflect both accesses (812). Note that the conflict resolution may result in sequentially handling the two memory accesses, may increase the memory access time of MR1 or MR2, and while being handled concurrently, the two memory requests may not be completed synchronously.

Referring to FIGS. 2 and 8, if the contents of shared memory address do not reside in the cache (804) and the memory access results in a cache miss, dual-access miss and replacement unit 322 handles the memory accesses based on the type of access and according to a conflict resolution policy. For example, if MR1 and MR2 are both read requests (814), then dual-access miss and replacement unit 322 identifies the least-recently-used location of the set and replaces the contents of that cache location with the contents of the memory location corresponding to the shared target memory location (816). Dual-access cache 210 may provide the contents of the shared target memory location to memory controllers 206 and 208 or the memory requestor or crossbar 212 may provide those contents directly to memory controllers 206 and 208 (818). Meanwhile, dual-access miss and replacement unit 322 updates the least-recently-used location information and the next-to least-recently-used location information for the set corresponding to the shared target memory address of MR1 and MR2 (820). If MR1 and MR2 are both write requests or a read request and a write request (i.e., are not both read requests) (814), then dual-access miss and replacement unit 322 identifies the least-recently-used location of the set for replacement (822) and applies a conflict resolution policy to the concurrent memory requests. The conflict resolution policy may determine whether the least-recently-used location is first replaced with contents of main memory and provided to service the read request or first read from that location by the read access and an operand is then written to that location to service the write request (824). Dual-access miss and replacement unit 322 updates the least-recently-used location information and the next-to least-recently-used location information for the set corresponding to the shared target memory address of MR1 and MR2 (826).

Figure 9:
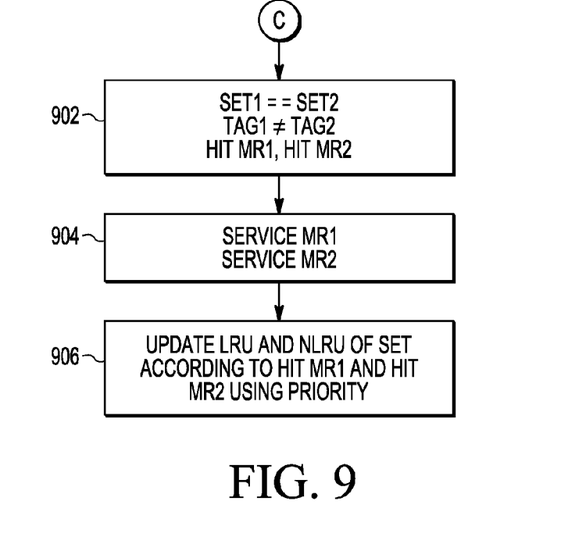

Referring to FIGS. 2, 6, and 9, if comparison of the tags (610) indicates that the target memory locations are different, then dual-access miss and replacement unit 322 determines whether the accesses to different locations of the same set result in cache hits (612). If MR1 and MR2 access the same set of the cache but different locations, and the contents of the target memory locations are both resident in the cache (902), then dual-access miss and replacement unit 322 concurrently services both memory requests (904) and updates the least-recently-used location information and the next-to least-recently-used location information for the set according of the hit of MR1 and the hit of MR2 targeting different memory locations of dual-access cache 210. For example, dual-access miss and replacement unit 322 may prioritize one of the two memory requests (e.g., using a prioritization technique such as round-robin between memory requestors or other suitable selection technique) and updates the least-recently-used location information and the next-to least-recently-used location information for the set according to the prioritization (906).

Figure 10:
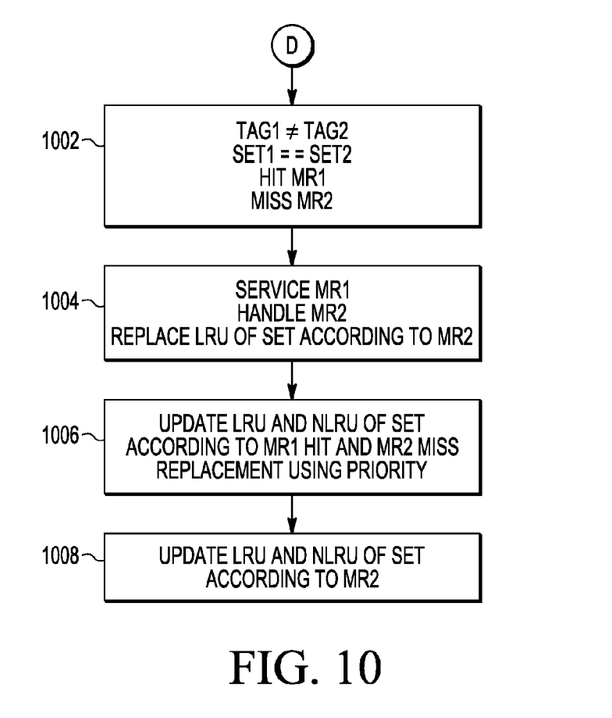

Referring to FIGS. 2, 6, and 10, if MR1 and MR2 access the same set of the cache, but target different memory locations, and do not result in two cache hits (612), dual-access miss and replacement unit 322 may determine whether two cache misses occur (614). If MR1 results in a cache hit and MR2 results in a cache miss (1002), dual-access miss and replacement unit 322 services MR1 and handles MR2 by replacing the least-recently-used location of the set of the cache according to the request of MR2 (1004). Since handling of those memory requests may have different access times that result in losing synchrony between the two memory requests, the least-recently-used location and next-to least-recently-used locations of the set may be sequentially updated, e.g., first according to the hit of MR1 (1006) and according to the miss replacement of MR2 using a prioritization technique (1008).

Figure 11:
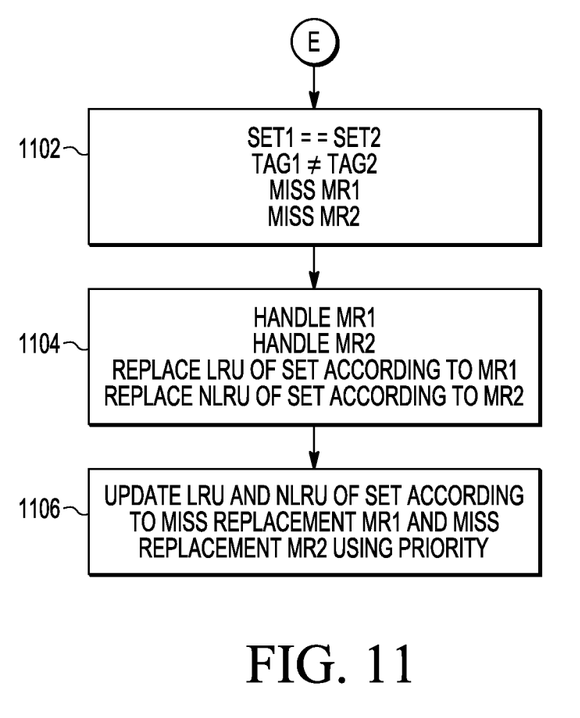

Referring to FIGS. 2, 6, and 11, if MR1 and MR2 access the same set of the cache but target different memory locations, and do not result in at least one cache hit (614), MR1 and MR2 result in two cache misses that may have similar access times (1102). Dual-access miss and replacement unit 322 concurrently handles MR1 and MR2 and replaces the least-recently-used location of the set according to MR1 and replaces the next-to least-recently-used location of the set according to MR2 (1104). Dual-access miss and replacement unit 322 updates the temporal information for at least the least-recently-used location and the next-to least-recently-used location of the set according to the miss replacement of MR1 and the miss replacement of MR2. The update may be made according to prioritization, e.g., if the access times are the same (1106).

In at least one embodiment, a method includes generating least-recently-used location information for a shared set-associative multi-access cache and next-to least-recently-used location information for the shared set-associative multi-access cache. The method includes concurrently accessing a shared set-associative multi-access cache in response to a first memory request from a first memory requestor and a second memory request from a second memory requestor based on the least-recently-used location information and the next-to least-recently-used location information. The method may include updating the least-recently-used location information and the next-to least-recently-used location information in response to concurrent access to the shared set-associative multi-access cache according to the first memory request and the second memory request. The concurrently accessing may include comparing a first set field of the first address to a second set field of the second address.

The concurrently accessing may include independently handling the first memory access concurrently with the second memory access in response to the first set field being different from the second set field. The concurrently accessing may include cooperatively handling the first memory access concurrently with the second memory access in response to the first set field and the second set field identifying a target set. The independently handling may include accessing contents of the shared set-associative multi-access cache by the first memory requestor via a first bus based on first least-recently-used location information for a first set. The independently handling may include accessing contents of the shared set-associative multi-access cache by the second memory requestor via a second bus based on second least-recently-used location information for a second set. The independently handling may include updating the first least-recently-used location information and first next-to least-recently-used location information for the first set and updating the second least-recently-used location information and second next-to least-recently-used location information for the second set.

The cooperatively handling may include comparing a first tag field of the first address to a second tag field of the second address. The cooperatively handling may include, in response to the first tag field being different from the second tag field: concurrently accessing a first cache element of the target set and a second cache element of the target set, and updating the least-recently-used location information for the target set and the next-to least-recently-used location information for the target set in response to concurrently accessing the first cache element and the second cache element. The concurrently accessing the first cache element of the target set and a second cache element of the target set may include in response to the first tag field resulting in a first cache hit and the second tag field resulting in a second cache hit: accessing contents of a first location of the target set associated with the first cache hit, and accessing contents of a second location of the target set associated with the second cache hit. The concurrently accessing the first cache element of the target set and a second cache element of the target set may include, in response to a first tag field resulting in a first cache miss and a second tag field resulting in a second cache miss: replacing contents of a least-recently-used location of the target set with information associated with the first memory request and replacing contents of a next-to least-recently-used location of the target set with information associated with the second memory request. The concurrently accessing the first cache element of the target set and a second cache element of the target set may include, in response to a first tag field resulting in a first cache hit and a second tag field resulting in a first cache miss: accessing contents of a location of the target set associated with the first cache hit and replacing contents of a least-recently-used location of the target set in response to the first cache miss.

The cooperatively handling may include, comparing a first tag field of the first address to a second tag field of the second address. The cooperatively handling may include, in response to the first tag field and the second tag field being the same and identifying a target location of the first set: accessing the target location according to the first and second memory requests and in response to the first tag field and the second tag field resulting in a cache miss, replacing contents of a least-recently-used location of the target set in response to accessing the target location and updating the least-recently-used location information for the target set and the next-to least-recently-used location information for the target set in response to replacing contents of the least-recently-used location. The cooperatively handling may include, comparing a first tag field of the first address to a second tag field of the second address. The cooperatively handling may include, in response to the first tag field and the second tag field being the same and identifying a target location of the first set: accessing the target location according to the first and second memory requests and in response to the first tag field and the second tag field resulting in a cache hit, updating the least-recently-used location information for the target set and the next-to least-recently-used location information for the target set in response to the accessing the target location. A determination of the least-recently-used location information and the next-to least-recently-used location cache locations may exclude any locked locations of the set-associative multi-access cache. The first and second memory requestors may be the same requestor issuing multiple memory requests in parallel.

In at least one embodiment, an apparatus includes shared set-associative multi-access cache concurrently responsive to a first memory access and a second memory access. The shared set-associative multi-access cache includes shared set-associative multi-access tag storage corresponding to the shared set-associative multi-access cache and concurrently responsive to the first memory access and the second memory access. The shared set-associative multi-access cache includes first comparator logic configured to generate first compare information based on a first tag portion of a first address of the first memory access and a first set of tags stored in the shared set-associative multi-access tag storage corresponding to a first set portion of the first address. The shared set-associative multi-access cache includes second comparator logic configured to generate second compare information based on a second tag portion of a second address of the second memory access and a second set of tags stored in the shared set-associative multi-access tag storage corresponding to a second set portion of the second address.

The shared set-associative multi-access cache includes shared miss and replacement logic configured to control access of contents of the shared set-associative multi-access cache in response to the first compare information, the second compare information, least-recently-used location information for the first set of tags, next-to least-recently-used location information for the first set of tags, least-recently-used location information for the second set of tags, and next-to least-recently-used location information for the second set of tags. The shared miss and replacement logic may be configured to concurrently update the least-recently-used location information for the first set of tags and the next-to least-recently-used location information for the first set of tags in response to the first memory access and the least-recently-used location information for the second set of tags and the next-to least-recently-used location information for the second set of tags in response to the second memory access. The first set portion and the second set portion may be identical and the first set of tags and the second set of tags may be the same set of tags for a target set of tags and the shared miss and replacement logic may be configured to update the least-recently-used location information for the target set of tags and the next-to least-recently-used location information for the target set of tags in response to the first memory access and the second memory access. The first set portion and the second set portion may be identical and, in response to the first memory access and the second memory access resulting in a first cache miss and a second cache miss, the first tag field and the second set field may identify distinct elements of a target set. The shared miss and replacement logic may be configured to replace contents of a least-recently-used location of the target set with information associated with the first memory request and to replace contents of a next-to least-recently-used location of the target set with information associated with the second memory request.

The apparatus may include a first master bus coupled to the shared set-associative multi-access cache. The apparatus may include a second master bus coupled to the shared set-associative multi-access cache. The shared set-associative multi-access cache may include a first bus controller configured to issue the first memory request received from the first master bus. The shared set-associative multi-access cache may include a second bus controller configured to issue the second memory request received from the second master bus. The apparatus may include a memory. The apparatus may include a first slave bus coupled to the shared set-associative multi-access cache. The apparatus may include a second slave bus coupled to the shared set-associative multi-access cache. The apparatus may include a cross-bar circuit coupled to the memory and coupled to the shared set-associative multi-access cache using the first slave bus and the second slave bus. The the shared set-associative multi-access cache may include a first bus controller configured to issue a first miss fetch to the memory using the cross-bar circuit in response to a first cache miss of the first memory request. The the shared set-associative multi-access cache may include a second bus controller configured to issue a second miss fetch to the memory using the cross-bar circuit in response to a second cache miss of the second memory request. The apparatus may include a first memory requestor configured to access the shared set-associative multi-access cache according to the first request via the first bus controller and the first bus. The apparatus may include a second memory requestor configured to access the shared set-associative multi-access cache according to the second request via the second bus controller and the second bus. The first and second memory requestors may be the same requestor issuing multiple memory requests in parallel using the first and second busses.

In at least one embodiment, a method includes, in response to a first memory access of a shared set-associative multi-access cache concurrent with a second memory access of the shared set-associative multi-access cache resulting in a first cache miss and a second cache miss, a first address of the first memory access having a first set field and a first tag field and a second address of the second memory access having a second set field and a second tag field, the first set field, the first tag field, the second set field, and the second tag field identifying distinct elements of a target set: replacing contents of a least-recently-used location of the target set with information associated with the first memory request, replacing contents of a next-to least-recently-used location of the target set with information associated with the second memory request, and updating the least-recently-used location information for the target set and the next-to least-recently-used location information for the target set.

Although the invention is described herein with reference to specific embodiments, various modifications and changes can be made without departing from the scope of the present invention as set forth in the claims below. For example, while the invention has been described in an embodiment in which the multi-access cache is a dual access, four-way, set associative cache, one of skill in the art will appreciate that the teachings herein can be utilized with access by more than two requestors, using a greater number of parallel memory accesses, or using a cache with a higher order of set associativity. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method comprising:
   generating least-recently-used location information for a shared set-associative multi-access cache and next-to least-recently-used location information for the shared set-associative multi-access cache; and
   concurrently accessing a shared set-associative multi-access cache in response to a first memory request from a first memory requestor and a second memory request from second memory requestor, the concurrently accessing being based on the least-recently-used location information and the next-to least-recently-used location information, wherein the concurrently accessing further comprises
      comparing a first set field of a first address of the first memory access to a second set field of a second address of the second memory access,
      independently handling the first memory access concurrently with the second memory access in response to the first set field being different from the second set field, and cooperatively handling the first memory access concurrently with the second memory access in response to the first set field and the second set field identifying a target set.

2. The method, as recited in claim 1, further comprising: updating the least-recently-used location information and the next-to least-recently-used location information in response to concurrent access to the shared set-associative multi-access cache according to the first memory request and the second memory request.

3. The method, as recited in claim 1, wherein the independently handling comprises:
   accessing contents of the shared set-associative multi-access cache by the first memory requestor via a first bus based on first least-recently-used location information for a first set; and
   accessing contents of the shared set-associative multi-access cache by the second memory requestor via a second bus based on second least-recently-used location information for a second set; and
   updating the first least-recently-used location information and first next-to least-recently-used location information for the first set and updating the second least-recently-used location information and second next-to least-recently-used location information for the second set.

4. The method, as recited in claim 1, wherein the cooperatively handling comprises:
   comparing a first tag field of the first address to a second tag field of the second address;
   in response to the first tag field being different from the second tag field:
      concurrently accessing a first cache element of the target set and a second cache element of the target set; and
      updating the least-recently-used location information for the target set and the next-to least-recently-used location information for the target set in response to concurrently accessing the first cache element and the second cache element.

5. The method, as recited in claim 4, wherein the concurrently accessing the first cache element of the target set and a second cache element of the target set comprises:
   in response to the first tag field resulting in a first cache hit and the second tag field resulting in a second cache hit:
      accessing contents of a first location of the target set associated with the first cache hit; and
      accessing contents of a second location of the target set associated with the second cache hit.

6. The method, as recited in claim 4, wherein the concurrently accessing the first cache element of the target set and a second cache element of the target set comprises:
   in response to a first tag field resulting in a first cache miss and a second tag field resulting in a second cache miss:
      replacing contents of a least-recently-used location of the target set with information associated with the first memory request; and
      replacing contents of a next-to least-recently-used location of the target set with information associated with the second memory request.

7. The method, as recited in claim 4, wherein the concurrently accessing the first cache element of the target set and a second cache element of the target set comprises:
   in response to a first tag field resulting in a first cache hit and a second tag field resulting in a first cache miss:
      accessing contents of a location of the target set associated with the first cache hit; and
      replacing contents of a least-recently-used location of the target set in response to the first cache miss.

8. The method, as recited in claim 1, wherein the cooperatively handling comprises:
   comparing a first tag field of the first address to a second tag field of the second address;
   in response to the first tag field and the second tag field being the same and identifying a target location of the first set:
      accessing the target location according to the first and second memory requests; and
      in response to the first tag field and the second tag field resulting in a cache miss:
         replacing contents of a least-recently-used location of the target set in response to accessing the target location; and
         updating the least-recently-used location information for the target set and the next-to least-recently-used location information for the target set in response to replacing contents of the least-recently-used location.

9. The method, as recited in claim 1, wherein the cooperatively handling comprises:
   comparing a first tag field of the first address to a second tag field of the second address;
   in response to the first tag field and the second tag field being the same and identifying a target location of the first set:
      accessing the target location according to the first and second memory requests; and
      in response to the first tag field and the second tag field resulting in a cache hit updating the least-recently-used location information for the target set and the next-to least-recently-used location information for the target set in response to the accessing the target location.

10. The method, as recited in claim 1, wherein a determination of the least-recently-used location information and the next-to least-recently-used location information excludes any locked locations of the set-associative multi-access cache.

* * * * *